(12) United States Patent
Kanabar

(10) Patent No.: US 6,668,166 B1
(45) Date of Patent: Dec. 23, 2003

(54) APPARATUS AND METHOD FOR MOBILE AUTHENTICATION EMPLOYING INTERNATIONAL MOBILE SUBSCRIBER IDENTITY

(75) Inventor: Paresh Kanabar, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/338,334

(22) Filed: Jun. 23, 1999

(51) Int. Cl.[7] .................................................. H04Q 7/20
(52) U.S. Cl. .................. 455/411; 455/432.2; 455/435.1
(58) Field of Search ................................. 455/411, 432, 455/433, 435, 560, 422, 426, 432.2, 435.1, 422.1; 380/247, 248, 258, 270

(56) References Cited

U.S. PATENT DOCUMENTS 5,862,481 A * 1/1999 Kulkarni et al. ......... 455/432.2
6,253,081 B1 * 6/2001 Koster ..................... 455/433
6,285,880 B1 * 9/2001 Gagnon et al. ............ 455/432
6,438,369 B1 * 8/2002 Huang et al. .............. 455/432

OTHER PUBLICATIONS

TR 45 TIA/EIA–41–D, TIA/EIA/IS–751, Modifications to Support IMSI, pp. 19–21.

ANSI 41–C TIA/EIA/PN–2991.5, Pre–Publication Version, Nov. 19, 1995, pp. 26, 27, 29+.

* cited by examiner

*Primary Examiner*—Lester G. Kincaid

(57) ABSTRACT

A mobile telecommunications system includes a serving system and a home location register which yields MIN-free invoke response messages authreq, asreport, and afreport if shared secret data is shared with the serving system. This is true even if the mobile identification number is required to compute an authentication response and the mobile subscriber identification in the invoking message did not include the mobile identification number.

11 Claims, 3 Drawing Sheets

APPARATUS AND METHOD FOR MOBILE AUTHENTICATION EMPLOYING INTERNATIONAL MOBILE SUBSCRIBER IDENTITY

FIELD OF THE INVENTION

The invention relates to the wireless radio telecommunications, and, more particularly, to the authentication of mobile stations.

BACKGROUND OF THE INVENTION

The use of mobile telecommunications systems, including cellular telephones and personal communications services (PCS), has seen explosive growth, particularly in the past decade. The use of mobile, or cellular, telephones, which was once a relative novelty, has become so commonplace that it is not unusual to see people conversing on the telephone, as they walk along the sidewalk, as they drive, even as they attend a concert or a play. There are many reasons for this explosive growth, but it would not have been possible without the security and confidentiality provided by modem mobile systems.

Security and confidentiality are typically provided in a mobile telecommunications system through a combination of devices, including; the assignment of a temporary mobile subscriber identity to a mobile unit, encryption of information being transmitted along the radio path, the authentication of each mobile unit, and the validation of the mobile unit equipment. A temporary mobile subscriber identity is sent by a visiting location register to the home or visited mobile switching center, and is, in effect, an "alias" which prevents observers from detecting a mobile user's calling patterns. The registration process requires a mobile user to indicate to a base station that he is active in the system. This permits a mobile switching center to locate a mobile subscriber's location and determine the mobile's activity status. Encryption typically involves the use of algorithms that rearrange the component bits of a message, using an algorithm known to only the network and the mobile subscriber. The network and subscriber employ the same algorithm and the same key to "scramble", or re-arrange, the data. The key and the algorithm are updated frequently, even during the course of a single telephone call. Equipment validation is a process whereby the mobile network checks the mobile equipment against lists of valid, suspect, and fraudulent mobile units contained within an equipment identity register. Validation may take place during the authentication process. The authentication process typically involves the transmission of a random number "seed" from a base station to the mobile device. Both the mobile device and the base station operate on the seed with an authentication algorithm to produce an authentication number. The mobile device transmits its authentication number to the base station which passes the number to the mobile switching center, where the two authentication numbers are compared. If they are identical, the mobile switching center grants the system access requested by the mobile device.

Conventional mobile telecommunications services employ a mobile identification number (MIN) for authentication, for termination, and for many other operations. However, the mobile identification number has proven inadequate for worldwide applications. Consequently, systems are being developed which employ an international mobile subscriber identity (IMSI) that will allow mobile telecommunications devices to operate seamlessly throughout the world. At some point, when IMSI devices are introduced there will be a mix of devices operating in the field; some mobile devices will employ a mobile identification number, some will employ an international mobile subscriber identity that is based on a more conventional mobile identification number, and some will employ "pure" IMSI numbers. With mobile units of all three types and systems of both types deployed, mobile devices of all types should, ideally, work with network systems of either type. In particular, a telecommunications system that permits the use of either a mobile identification number, or an international mobile subscriber identity number, would be highly desirable.

In particular, some EIA/TIA 41 D authentication processes employ a mobile identification number and, although the mobile identification number may be available at the subscriber's home location register, each time the mobile identification number is retrieved from the database, time and processing power are consumed. Additionally, time and processing power are consumed by the encoding, transmitting, and decoding of the number whenever it is transmitted, between a home location register and a visiting location register, for example. Furthermore, the message packet employed to communicate between devices such as a home location register and a visiting location register is already crowded and the inclusion of more information in the packet adds to the congestion. A telecommunications system that limits the number of times a mobile identification number is retrieved from a database and transmitted would therefore be highly desirable.

SUMMARY

A mobile telecommunications system in accordance with the principles of the present invention includes a home location register (HLR) that is responsive to EIA/TIA 41D messages, such as AUTHREQ, ASREPORT, and AFREPORT with, respectively, authreq, asreport, and afreport, messages. Even if shared secret data is shared at a visiting location register (VLR), the mobile identification number is employed in the authentication process, and the mobile identification number is not employed as the mobile subscriber identification (MSID) in the above invoke messages, the mobile subscriber's home location register does not return the mobile identification number in the authreq, asreport, and afreport return messages. That is, in accordance with the principles of the present invention, the invocation response messages authreq, asreport, and afreport are MIN-free if shared secret data is shared with the serving system and the mobile station has a true international mobile subscriber identity and a mobile identification number-based international mobile subscriber identity. This is true even if the mobile identification number is required to compute an authentication response and the mobile subscriber identification in the invoking message did not include the mobile identification number. By eliminating the mobile identification number from the returned message, the home location register reduces the time and processing power devoted to retrieving, transmitting, and encoding and decoding such information.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
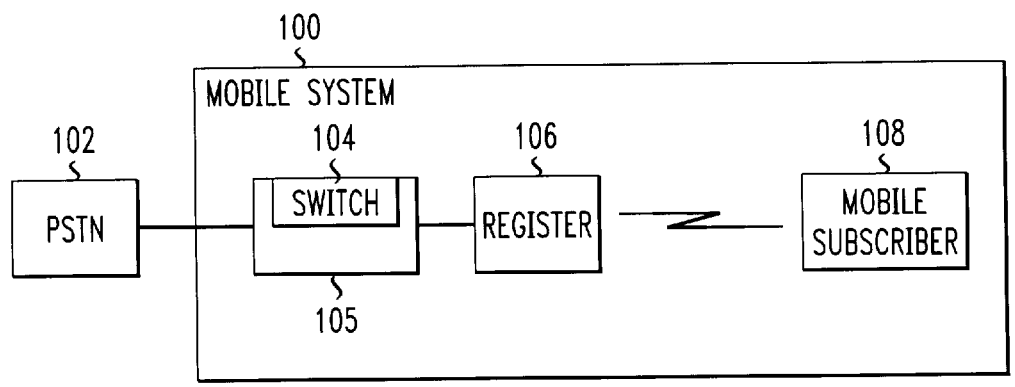
FIG. 1 is a conceptual block diagram of a mobile communications system in accordance with the principles of the present invention, in combination with a publicly switched telephone network.

The conceptual block diagram of FIG. 1 illustrates a mobile telecommunications system 100 in accordance with the principles of the present invention. The mobile system 100 may be operated in conjunction with the publicly switched telephone network, or land system, 102. The mobile telecommunications system 100 includes a serving system 104 and a home location register 106, which communicate with one another. The serving system may include one or more visiting location registers and one or more base stations, for example. In particular, the mobile telecommunications system 100 includes at least one switching component 104, such as a mobile switching center, at least one registering component 106, such as a home location register, and at least one mobile station 108. The mobile station may be of the mobile identification number (MIN) type, international mobile subscriber identity (IMSI) type, MIN-based IMSI type, or both MIN-based IMSI and IMSI type.

To accommodate all types of mobile station, the mobile telecommunications system 100 establishes a connection from a land station, as follows. When a call is directed to a mobile station from the publicly switched telephone network, the land system routes the call to the appropriate switching component 104 (only one of which is shown in this Figure) within the mobile system. The switching component 104 forwards the dialed digits, along with other information, to the registering component 106 to which the mobile station is assigned, and requests routing information for the mobile station 108 associated with the dialed digits. In response to the request for routing information, the registering component 106 returns routing information to the switching component 104. At various times, as will be described in greater detail in the discussion related to FIGS. 3, 4, and 5, the mobile station 108 is challenged to authenticate itself. In accordance with the principles of the present invention, the invocation response messages authreq, asreport, and afreport are MIN-free if shared secret data is shared with the serving system. This is true even if the mobile identification number is required to compute an authentication response and the mobile subscriber identification in the invoking message did not include the mobile identification number.

Figure 2:
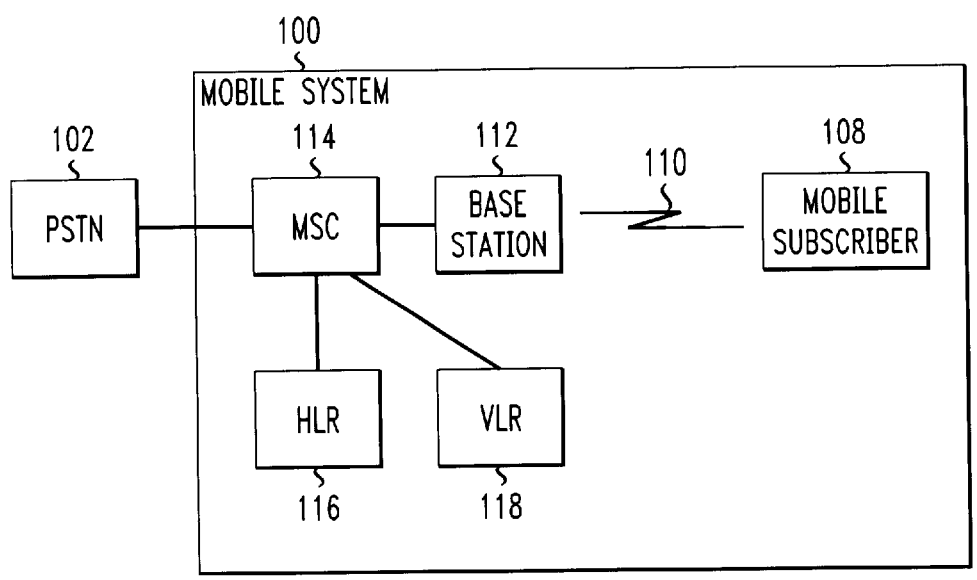
FIG. 2 is a more detailed conceptual block diagram of a mobile telecommunications system in accordance with the principles of the present invention.

The conceptual block diagram of FIG. 2 provides a more detailed view of a mobile telecommunications system in accordance with the principles of the present invention. The illustrative system 100 includes a mobile station 108, which may communicate, via a wireless link 110 with a base station 112. The base station, in turn, communicates with a mobile switching center 114 which operates as the switching component 104 in this illustrative embodiment. The mobile switching center 114 provides interfaces to the landline system 102 and to the remainder of the wireless, or mobile telecommunications system 100. The switching center 114 also provides mobility management for mobile stations.

The mobile system 100 also includes a complement of components that operate in accordance with TIA/EIA 41D, a telecommunications standard that is hereby incorporated by reference in its entirety. These components include a home location register (HLR) 116, which operates as the registering component 106 in this illustrative embodiment. The home location register 116 includes a database which stores, among other things, a permanent copy of the mobile subscriber's subscription information, location information which permits calls to be routed toward the mobile switching center associated with the mobile unit's current location. This information may include such things, as the mobile station roaming number (MSRN) or temporary local directory number (TLDN), the visiting location register (VLR) address, the mobile switching center (MSC) address), the international mobile subscriber identity (and the MIN, if available), the mobile subscriber ISDN number (MSISDN) teleservices and bearer services subscription information, and service restrictions, such as roaming limitations, supplementary service parameters. A stand-alone home location register supports such features as call delivery, message waiting notification, call forwarding, remote feature control, call transfer, subscriber PIN intercept, call waiting, conference calling, and voice message retrieval. Two "keys" are typically required to access the home location register 116. They are: an international mobile subscriber identity (IMSI) (or mobile identity number MIN) and a mobile station ISDN number (MSISDN).

The illustrative mobile system 100 also includes another IS-41 component, a visiting location register (VLR) 118. A visiting location register 118 is a register used by a mobile switching center to retrieve information for handling calls to or from a visiting mobile subscriber. The visiting location register dynamically stores subscriber information, such as the electronics serial number (ESN) of the user's mobile unit, the user's directory number (DN), and user profile information. This information is typically obtained from the visitor's home location register when the visitor enters an area covered by the visiting location register 118. This accumulation of information by the visiting location register is typically initiated by a visitor's registration with a visiting location register 118, through a mobile switching center 114, as the visitor enters an area served by a mobile switching center that is not served by the visitor's home location register. In response to the visiting mobile's registration with the visitor mobile switching center, the visitor mobile switching center requests the above information from the mobile switching center associated with the mobile's home location register.

Figure 3:
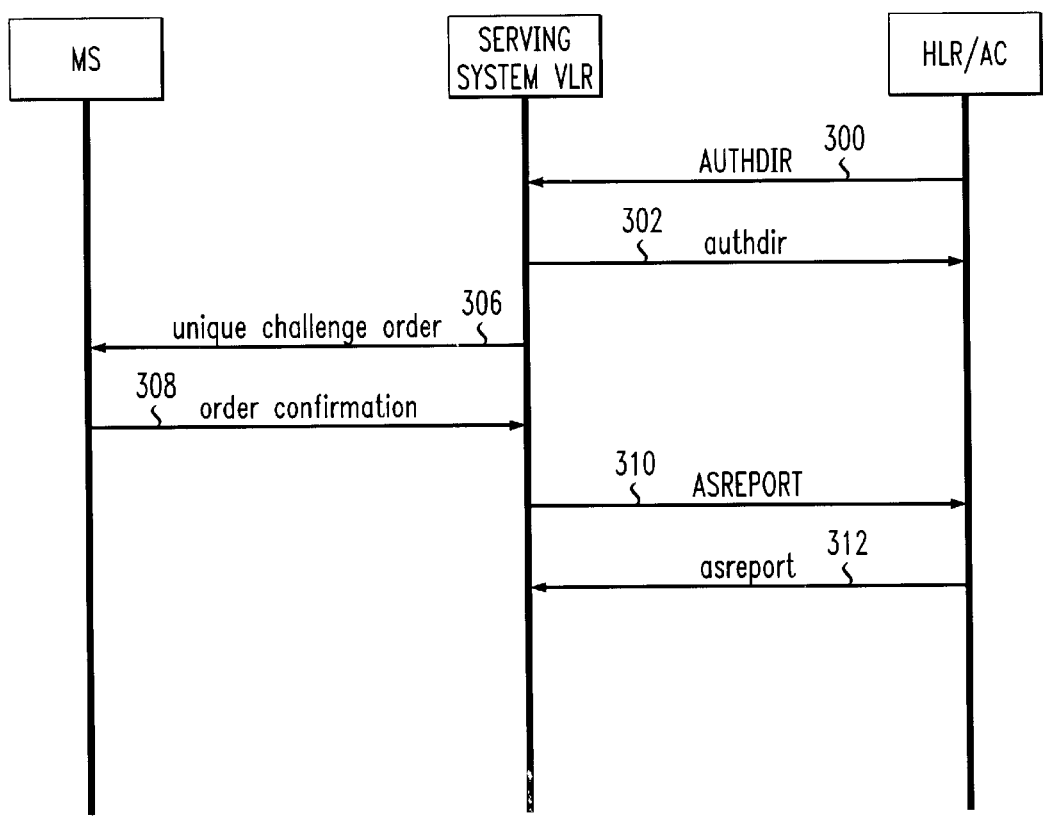
FIG. 3 is a call scenario diagram that illustrates a unique challenge process initiated by an authentication center.

The illustrative call scenario diagram of FIG. 3 depicts an authentication center unique challenge process in accordance with the principles of the present invention. In step 300 the authentication center selects a random unique number (RANDU), calculates a unique challenge response (AUTHU) and includes these parameters in an authentication directive invoke (AUTHDIR) message sent to the mobile station's serving system. The serving system illustratively includes a visiting location register. The authentication center may employ the mobile station's home location register, for example, to accomplish these tasks. In step 302 the visiting location register acknowledges the authentication directive invocation with an authentication directive return result (authdir) message sent to the authentication center. Subsequently, in step 306, the serving system issues a unique challenge order to the mobile station, including the random unique number in the order. In step 308 the mobile station responds to the unique challenge order by calculating its own value for the unique challenge response (AUTHU) and returns this value to the serving system.

In step 310 the serving system compares the unique challenge response it has received from the authentication center to that received from the mobile station and generates a unique challenge report (ASREPORT) indicating either success or failure. That is, the serving system determines whether the numbers match or not, and reports this determination to the authentication center. In step 312 the authentication center returns a message asreport to the serving system. Although the authentication center includes other parameters in the asreport message, in accordance with the principles of the invention, if shared secret data is shared with the serving system, the asreport return message is MIN-free. That is, even if the mobile identification number is required to compute the authentication result and the mobile identification number was not included in the invocation (which includes either MIN or IMSI as the mobile system identification), even if shared secret data is shared with the serving system, the asreport return message does not include the mobile station's mobile identification number. By eliminating the mobile identification number from the asreport message, database reads may be reduced, encoding and decoding of the mobile identification number may be eliminated, and the size of the packet required to transmit asreport may be reduced. All these effects translate into savings of processing power and time.

Figure 4:
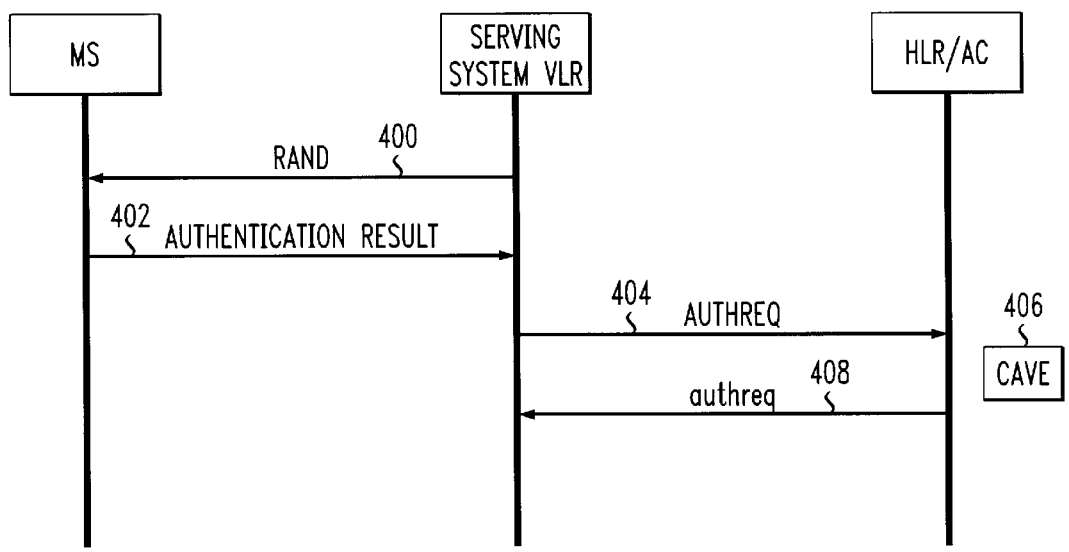
FIG. 4 is a call scenario diagram that illustrates a global challenge authentication procedure.

The call scenario diagram of FIG. 4 illustrates a basic global challenge authentication process in accordance with the principles of the present invention. In step 400 the serving system generates a random number (RAND) and sends it to the mobile station in a control channel overhead message train (OMT). In step 402, the mobile station employs the cellular authentication and voice encryption (CAVE) algorithm, using the mobile identification number (MIN), the random number RAND, the mobile station's electronic serial number and shared secret data A (SSD-A) to generate an authentication result (AUTHR). Shared secret data A and B are subsets of shared secret data, each of which comprises sixty-four of shared secret data's one hundred and twenty-eight bits. The mobile station transmits the authentication result to the serving system whenever it accesses the serving system for registration, call origination, or page response purposes. For origination, the dialed digits are used instead of MIN or IMSI_S as input to the cellular authentication and voice encryption algorithm.

In step 404 if shared secret data is not shared, the serving system forwards the mobile's mobile system identification (MSID), that is, either the mobile identification number (MIN), or the international mobile subscriber identity (IMSI), along with the authentication result AUTHR, and random number RAND to the authentication center in an AUTHREQ invoke message. In step 406 the authentication center independently computes an authentication result and compares its figure to that computed by the mobile station in step 402. If the results match, the mobile station is considered to be authentic. If the results do not match, the mobile station may be considered fraudulent and service may be denied to the mobile station. In step 408 the authentication center returns an authreq message which indicates whether the mobile has passed or failed the authentication process. The return result may include such parameters as an authentication algorithm version number, authentication response unique challenge parameter, etc. However, in accordance with the principles of the present invention, if shared secret data is shared, the serving system performs the calculations and forwards its result, along with that of the mobile station to the authentication center, where the results are compared as before, and results returned, as previously described. In accordance with the principles of the invention, no mobile identification number is returned in the authreq message even if shared secret data is shared with the serving system. This is true whether the mobile system transmitted an international mobile subscriber identity or mobile identification number as a part of the AUTHREQ invocation message. As with the asreport message, by eliminating the mobile identification number from the authreq message, database reads may be reduced, encoding and decoding of the mobile identification number may be eliminated, and the size of the packet required to transmit authreq may be reduced. All these effects translate into savings of processing power and time.

Figure 5:
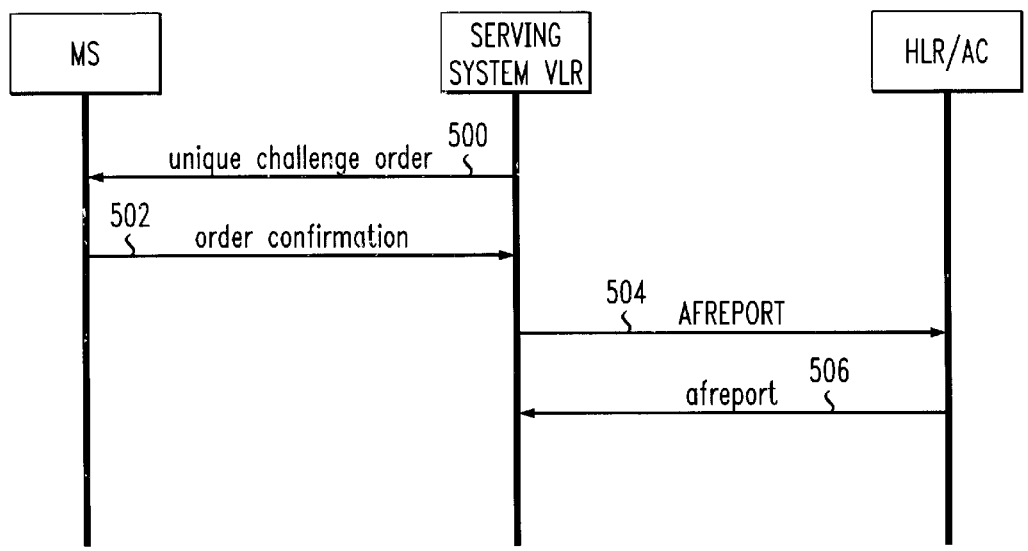
FIG. 5 is a call scenario diagram that illustrates a visiting location initiated unique challenge procedure when shared secret data is shared at the visiting location register.

The call scenario diagram of FIG. 5 depicts a unique challenge process initiated by a visiting location register in accordance with the principles of the present invention. In step 500 the serving system issues a unique challenge order to the mobile station. The unique challenge order includes a random number RANDU. In step 502 the mobile station computes an authentication result and returns a unique challenge response to the serving system. The unique challenge response may include such parameters as AUTHU, IMSI, etc. In step 504, the serving system compares the authentication number it computed to that computed by the mobile station. If the two numbers do not match, the serving system reports the failure to the authentication center in an AFREPORT message, which includes the mobile's electronic serial number and mobile station identification (MIN or IMSI). In response, the authentication center returns an afreport message to the serving system. In accordance with the principles of the invention, the afreport message returned to the serving system does not include a mobile identification number, even if the mobile identification number was not included in the AFREPORT invoke for SSD shared at the VLR. As with the asreport and authreq messages, by eliminating the mobile identification number from the afreport message, database reads may be reduced, encoding and decoding of the mobile identification number may be eliminated, and the size of the packet required to transmit afreport may be reduced. All these effects translate into savings of processing power and time.

The foregoing description of specific embodiments of the invention has been presented for the purposes of illustration and description. It is not intended to be exhaustive or to limit the invention to the precise forms disclosed, and many modifications and variations are possible in light of the above teachings. For example, although generally written in terms of cellular telephone systems, the invention may be used in conjunction with a personal communications services (PCS) system, with appropriate modifications known to those familiar with the art. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A registering component for a mobile telecommunications system comprising:

a database including a mobile identification number (MIN); and a communications means for responding to the invocation of an AUTHREQ message by returning a MIN-free authreq message.

2. The registering component of claim 1 wherein the registering component responds to the invocation of an ASREPORT message by returning a MIN-free asreport message.

3. The registering component of claim 1 wherein the registering component responds to the invocation of an AFREPORT message by returning a MIN-free afreport message.

4. The registering component of claim 1 wherein the registering component is a home location register (HLR).

5. A mobile telecommunications system in which shared secret data is shared at a visiting location register (VLR), and a mobile identification number is employed in the system's authentication process, including:
   a serving system; and
   a registering component responsive to messages from the serving system, the registering component comprising:
      a database including a mobile identification number (MIN); and
      a communications system operative to respond to the invocation of an AUTHREQ message by returning a MIN-free authreq message.

6. The registering component of claim 5 wherein the registering component responds to the invocation of an ASREPORT message by returning a MIN-free asreport message.

7. The registering component of claim 5 wherein the registering component responds to the invocation of an AFREPORT message by returning a MIN-free afreport message.

8. The registering component of claim 5 wherein the registering component is a home location register (HLR).

9. A method for authenticating a mobile station in a mobile telecommunications system which includes an HLR and a VLR, and in which shared secret data is shared at the VLR, and a mobile identification number is employed in the system's authentication process, comprising the steps of:
   (A) receiving an ASREPORT message at an HLR; and
   (B) returning a MIN-free asreport message from the HLR.

10. The method of claim 9 further comprising the steps of:
    (C) receiving an AUTHREQ message at an HLR; and
    (D) returning a MIN-free authreq message from the HLR.

11. The method of claim 9 further comprising the steps of:
    (E) receiving an AFREPORT at an HLR to a serving system; and
    (F) returning a MIN-free afreport message from the HLR.

* * * * *